United States Patent
Shamoto et al.

(10) Patent No.: US 12,103,093 B2
(45) Date of Patent: Oct. 1, 2024

(54) RADIUS ENDMILL AND MACHINE TOOL USING THE SAME, AND DESIGNING METHOD AND MACHINING METHOD OF RADIUS ENDMILL

(71) Applicants: MITSUBISHI HEAVY INDUSTRIES, LTD., Tokyo (JP); NATIONAL UNIVERSITY CORPORATION TOKAI NATIONAL HIGHER EDUCATION AND RESEARCH SYSTEM, Nagoya (JP)

(72) Inventors: Eiji Shamoto, Aichi (JP); Jun Eto, Tokyo (JP); Akira Kitano, Tokyo (JP); Tomomi Sugihara, Aichi (JP)

(73) Assignees: MITSUBISHI HEAVY INDUSTRIES, LTD., Tokyo (JP); NATIONAL UNIVERSITY CORPORATION TOKAI NATIONAL HIGHER EDUCATION AND RESEARCH SYSTEM, Nagoya (JP)

( * ) Notice: Subject to any disclaimer, the term of this patent is extended or adjusted under 35 U.S.C. 154(b) by 209 days.

(21) Appl. No.: 16/968,658

(22) PCT Filed: Apr. 8, 2019

(86) PCT No.: PCT/JP2019/015289
§ 371 (c)(1),
(2) Date: Aug. 10, 2020

(87) PCT Pub. No.: WO2019/203043
PCT Pub. Date: Oct. 24, 2019

(65) Prior Publication Data
US 2020/0406378 A1    Dec. 31, 2020

(30) Foreign Application Priority Data
Apr. 16, 2018   (JP) .................... 2018-078299

(51) Int. Cl.
B23C 5/10     (2006.01)

(52) U.S. Cl.
CPC ..................... B23C 5/10 (2013.01)

(58) Field of Classification Search
CPC ................... B23C 5/10; B23C 5/1009; B23C 2210/082; B23C 2210/084; B23C 2210/282; B23C 2210/321
See application file for complete search history.

(56) References Cited

U.S. PATENT DOCUMENTS 9,227,253 B1 *  1/2016  Swift ................. B23C 5/00
9,517,515 B2 * 12/2016  Shpigelman ........... B23C 5/10
(Continued)

FOREIGN PATENT DOCUMENTS

| CN | 1658992 A | 8/2005 |
|----|-----------|--------|
| CN | 103328142 A | 9/2013 |

(Continued)

OTHER PUBLICATIONS

Japan Patent Office "Office Action for Japanese Patent Application No. 2018-078299," Jan. 4, 2022.

(Continued)

*Primary Examiner* — Nicole N Ramos
(74) *Attorney, Agent, or Firm* — HAUPTMAN HAM, LLP

(57) ABSTRACT

A radius endmill suppressing chatter vibration includes a circular arc edge provided on an outer peripheral side of a distal end portion of a tool body, and a nose (R) angle (θr) that is an angular range in which the circular arc edge is formed in a vertical section including a central axis line of the tool body and which is equal to or less than 30°. The circular arc edge is formed, as a circular arc edge for a bottom surface, from a position having a tangential line in a direction that perpendicularly intersects the central axis line (Continued)

to a side surface in a bottom surface of the distal end portion of the tool body in a vertical section. A nose (R) height (Hr) that is a dimension of the circular arc edge in the direction of the central axis line is equal to or less than 0.75 mm.

6 Claims, 11 Drawing Sheets

(56) References Cited

U.S. PATENT DOCUMENTS

| | | | | |
|---|---|---|---|---|
| 10,131,003 | B2* | 11/2018 | Shpigelman | B23C 5/10 |
| 2005/0025584 | A1 | 2/2005 | Kolker et al. | |
| 2005/0186037 | A1 | 8/2005 | Svensson | |
| 2007/0154272 | A1 | 7/2007 | Wells et al. | |
| 2008/0089749 | A1 | 4/2008 | Wells et al. | |
| 2009/0252564 | A1 | 10/2009 | Volokh et al. | |
| 2010/0172703 | A1 | 7/2010 | Neubold | |
| 2011/0268513 | A1* | 11/2011 | Takagi | B23C 5/10 |
| | | | | 407/54 |
| 2014/0003873 | A1 | 1/2014 | Han et al. | |
| 2014/0133926 | A1* | 5/2014 | Budda | B23C 5/1009 |
| | | | | 407/54 |
| 2014/0341662 | A1* | 11/2014 | Yamayose | B23C 5/10 |
| | | | | 407/54 |
| 2015/0367427 | A1* | 12/2015 | Burton | B24B 3/021 |
| | | | | 451/48 |
| 2016/0082526 | A1* | 3/2016 | Swift | B23C 5/28 |
| | | | | 407/54 |
| 2016/0271706 | A1 | 9/2016 | Palmer et al. | |
| 2019/0160560 | A1 | 5/2019 | Kobayashi et al. | |

FOREIGN PATENT DOCUMENTS

| | | | | |
|---|---|---|---|---|
| CN | 206824730 | U | 1/2018 | |
| EP | 1864736 | A2 * | 12/2007 | ............... B23C 5/10 |
| JP | 2002-283121 | A | 10/2002 | |
| JP | 2003-323204 | A | 11/2003 | |
| JP | 2004-074397 | A | 3/2004 | |
| JP | 2006-212744 | A | 8/2006 | |
| JP | 2007-038344 | A | 2/2007 | |
| JP | 2013-031911 | A | 2/2013 | |
| JP | 2013-176842 | A | 9/2013 | |
| WO | 2018/003684 | A1 | 1/2018 | |

OTHER PUBLICATIONS

PCT/ISA/210, "International Search Report for International Application No. PCT/JP2019/015289," Jun. 18, 2019.

PCT/ISA/237, "Written Opinion of the International Searching Authority for International Application No. PCT/ JP2019/015289," Jun. 18, 2019.

Europe Patent Office, "Search Report for European Patent Application No. 19789340.7," Feb. 24, 2021.

Shamoto, E., "Mechanism and Suppression of Chatter Vibrations in Cutting," Daido Steel Technical Review (DENKISEIKO), Oct. 12, 2011, p. 143-155, vol. 82, No. 2.

China National Intellectual Property Administration, "Office Action and Search Report for Chinese Patent Application 201980013777. 2," Oct. 9, 2022.

Zhang Yifang et al., 'Handbook of metal cutting', Shanghai Science and Technology Press (4th Edition), p. 7.8-7.9, May 31, 2011.

* cited by examiner

RADIUS ENDMILL AND MACHINE TOOL USING THE SAME, AND DESIGNING METHOD AND MACHINING METHOD OF RADIUS ENDMILL

RELATED APPLICATIONS

The present application is National Phase of International Application No. PCT/JP2019/015289 filed Apr. 8, 2019, and claims priority from Japanese Application No. 2018-078299, filed Apr. 16, 2018, the disclosure of which is hereby incorporated by reference herein in its entirety.

TECHNICAL FIELD

The present invention relates to a radius endmill and a machine tool using the same, and a designing method and a machining method of the radius endmill.

BACKGROUND ART

Thinning of structure components used in an aircraft, for example, has advanced in terms of improvement in precision and weight reduction. As a coupling member or the like between a body panel produced through sheet metal molding in the related art and a frame (hereinafter, simply referred to as a "coupling member"), for example, utilization of a coupling member manufactured through machining has been started in terms of weight reduction and improvement in precision. However, since machining generally leads to an increase in material costs, it is necessary to reduce machining costs.

In order to reduce machining costs, it is necessary to reduce a machining time. To do so, it is necessary to increase a feed speed and a depth of cut. However, in a case in which a part is machine-worked into the same shape as that of a part formed through sheet metal molding, an increase in depth of cut is limited due to a thin material thickness. Thus, it is important to increase the feed speed.

One of points to note when the feed speed is increased is surface roughness. Surface roughness Rz [mm] is represented by the following equation using an feed rate fz [mm/tooth] and a nose R [mm] that is a radius of a circular arc edge at an edge tip.

$$Rz = fz2/(8 \times R) \quad (1)$$

As can be understood from Equation (1), it is necessary to increase the nose R in order to improve the feed rate fz.

For example, a radius endmill having a circular arc edge at an edge tip of a tool is used in many cases for machining of aircraft components. In a square endmill that does not have a circular arc edge, a cutting force is generated mainly in a feeding direction. However, the radius endmill has an arc shape, a cutting force is generated in a direction of a central axis line of the tool as well, and a cutting force may be generated in a plate thickness direction in some cases. Therefore, according to the radius endmill, chatter vibrations are likely to occur in a workpiece having a thin plate portion. In one-chuck machining in which a workpiece is fixed once and is then machined, in particular, it is not possible to avoid occurrence of chatter vibrations since machining that causes a cutting force in the plate thickness direction of the thin plate portion of the workpiece is also performed. Thus, there is a problem that there is no other choice than reducing the nose R in terms of stability against chatter vibrations regardless of the necessity that the nose R has to be increased as represented by Equation (1).

Countermeasures for such chatter vibrations are disclosed in PTLs 1 and 2. PTL 1 discloses that an outer peripheral edge connected to a circular arc edge is provided. PTL 2 discloses that different pitches are provided between adjacent spiral grooves.

Also, regenerative self-excited chatter vibrations have been reported as chatter vibrations (NPL 1). The regenerative self-excited chatter vibrations are generated such that vibrations generated when cutting with a previous edge is performed remain as irregularities of a machined surface and the vibrations are regenerated as variations in uncut chip thickness in current cutting. Therefore, a closed loop in which a cutting force varies and vibrations are regenerated is configured, the vibrations grow under predetermined conditions, and large chatter vibrations are generated.

CITATION LIST

Patent Literature

[PTL 1]
Japanese Unexamined Patent Application, Publication No. 2006-212744
[PTL 2]
Japanese Unexamined Patent Application, Publication No. 2013-176842

Non Patent Literature

[NPL 1]
Eiji Shamoto, "Mechanism and Suppression of Chatter vibrations in Cutting", Denkiseiko, Vol. 82, No. 2 (2011), p. 143 to p. 155

SUMMARY OF INVENTION

Technical Problem

Since regenerative self-excited chatter vibrations are not examined in PTLs 1 and 2 listed above, PTLs 1 and 2 are not sufficient in terms of reduction of chatter vibrations.

The present inventors conducted intensive studies and focused on the fact that a regeneration width varies depending on the size and the shape of a circular arc edge provided at an edge tip of a radius endmill. Here, the regeneration width is a dimension that may become a cause of regenerative self-excited chatter vibrations and means a dimension in a cutting direction in which cutting with one edge is performed, that is, a dimension in a cutting direction in which the circular arc edge and the workpiece are brought into contact with each other. Since influences of vibrations at the time of regeneration of the previous edge increases as the regeneration width increases, chatter vibrations are more likely to be generated, and machining stability is more degraded.

The present invention was made in view of such circumstances, and an object thereof is to provide a radius endmill and a machine tool using the same, and a designing method and a machining method of the radius endmill capable of suppressing chatter vibrations and improving machining stability.

Solution to Problem

A radius endmill according to an aspect of the present invention includes: a circular arc edge provided on an outer peripheral side of a distal end portion of a tool body, and an angular range in which the circular arc edge is formed in a vertical section including a central axis line of the tool body is equal to or less than 30°.

By setting the angular range (nose R angle θr) in which the circular arc edge is formed to be equal to or less than 30°, it is possible to obtain the regeneration width of equal to or less than ½ the regeneration width obtained in a case in which the angular range is set to 90°, thereby to suppress chatter vibrations, and to improve machining stability.

A lower limit value of the angular range is 0.09°, for example. The radius (nose R) forming the arc shape of the circular arc edge is equal to or greater than 1 mm and equal to or less than 1000 mm, for example.

Further, in the radius endmill according to an aspect of the present invention, the circular arc edge is formed, as a circular arc edge for a bottom surface, at least from a position having a tangential line in a direction that perpendicularly intersects the central axis line in the bottom surface of the distal end portion of the tool body to a side surface in the vertical section, and a dimension of the circular arc edge for the bottom surface in the direction of the central axis line is equal to or less than 0.75 mm.

By forming the circular arc edge from the position having the tangential line in the direction that perpendicularly intersects the central axis line of the tool body in the bottom surface of the distal end portion of the tool body to the side surface in the vertical section, the radius endmill for machining the bottom surface is provided. By setting the dimension (nose R height Hr) of the circular arc edge in the direction of the central axis line of the tool body in the vertical section to be equal to or less than 0.75 mm, it is possible to obtain the regeneration width of equal to or less than ½ the regeneration width obtained in the case in which the angular range of the circular arc edge is set to 90°, thereby to suppress chatter vibrations, and to improve machining stability.

A lower limit value of the nose R height Hr is 0.03 mm, for example.

Further, in the radius endmill according to an aspect of the present invention, the circular arc edge is formed, as a circular arc edge for a side surface, from a position having a tangential line in a direction parallel to the central axis line in the side surface of the distal end portion of the tool body to a bottom surface of the distal end portion in the vertical section, and a dimension of the circular arc edge for the side surface in the direction that perpendicularly intersects the direction of the central axis line is equal to or less than 0.75 mm.

By forming the circular arc edge from the position having the tangential line in the direction parallel to the central axis line of the tool body in the side surface of the distal end portion of the tool body to the bottom surface of the distal end portion in the vertical section, the radius endmill for machining the side surface is provided. By setting the dimension (nose R height Hr) of the circular arc edge in the direction that perpendicularly intersects the direction of the central axis line of the tool body in the vertical section to be equal to or less than 0.75 mm, it is possible to obtain the regeneration width of equal to or less than ½ the regeneration width obtained in the case in which the angular range of the circular arc edge is set to 90°, thereby to suppress chatter vibrations, and to improve machining stability.

A lower limit value of the nose R height Hr is 0.03 mm, for example.

Further, in the radius endmill according to an aspect of the present invention, the circular arc edge is formed, as a circular arc edge for a bottom surface, at least from a position having a tangential line in a direction that perpendicularly intersects the central axis line in the bottom surface of the distal end portion of the tool body to a side surface in the vertical section, and a dimension of the circular arc edge for the bottom surface in the direction of the central axis line is equal to or less than 0.75 mm, and the circular arc edge is formed, as a circular arc edge for a side surface, from a position having a tangential line parallel to the central axis line in the side surface of the distal end portion of the tool body to the bottom surface of the distal end portion in the vertical section, and a dimension of the circular arc edge for the side surface in the direction that perpendicularly intersects the direction of the central axis line is equal to or less than 0.75 mm.

By forming the circular arc edge for the bottom surface from the position having the tangential line in the direction that perpendicularly intersects the central axis line of the tool body in the bottom surface of the distal end portion of the tool body to the side surface in the vertical section and forming the circular arc edge for the side surface from the position having the tangential line parallel to the central axis line of the tool body in the side surface of the distal end portion of the tool body to the distal end portion in the vertical section, a radius endmill for hybrid machining capable of performing machining of a bottom surface and machining of a side surface is provided. By setting the dimension of the circular arc edge for the bottom surface in the direction of the central axis line of the tool body to be equal to or less than 0.75 mm and setting the dimension of the circular arc edge for the side surface in the direction that perpendicularly intersects the central axis line of the tool body to be equal to or less than 0.75 mm, it is possible to obtain the regeneration width of equal to or less than ½ the regeneration width obtained in the case in which the angular range of the circular arc edge is set to 90°, thereby to suppress chatter vibrations, and to improve machining stability.

Also, a machine tool according to an aspect of the present invention includes: any one of the aforementioned radius endmills; and a drive portion configured to cause the radius endmill to rotate about the central axis line of the radius endmill with a proximal end portion of the radius endmill fixed to the drive portion, and a radius of an arc forming an arc shape of the circular arc edge in the radius endmill is determined on the basis of a feed per one edge calculated from a rotation frequency and a cutting feed speed of the drive portion and required surface roughness required during machining.

The feed per one edge is calculated from the rotation frequency and the cutting feed speed of the drive portion. The radius of the circular arc edge in the radius endmill is determined on the basis of the feed per one edge and the required surface roughness required during machining (for example, surface roughness required in terms of a drawing). In this manner, it is possible to suppress chatter vibrations and to perform stable machining under arbitrary cutting conditions that satisfy the required surface roughness.

If the radius of the circular arc edge is determined using the maximum rotation frequency and cutting feed speed of the drive portion, it is possible to maximize the machining rate.

Also, a radius endmill designing method according to an aspect of the present invention is a radius endmill designing method for designing any one of the aforementioned radius endmills, and the method includes: determining a radius of an arc forming an arc shape of the circular arc edge in the radius endmill on the basis of a feed per one edge calculated from a rotation frequency and a cutting feed speed of a drive portion configured to cause the radius endmill to rotate about the central axis line and required surface roughness required during machining.

The feed per one edge is calculated from the rotation frequency and the cutting feed speed of the drive portion. The radius of the circular arc edge in the radius end mil is determined on the basis of the feed per one edge and the required surface roughness required during machining (for example, surface roughness required in terms of a drawing). In this manner, it is possible to perform machining with suppressed chatter vibrations under arbitrary cutting conditions that satisfy the required surface roughness.

If the radius of the circular arc edge is determined using the maximum rotation frequency and cutting feed speed of the drive portion, it is possible to maximize the machining rate.

A machining method according to an aspect of the present invention is a machining method for machining a workpiece using any one of the aforementioned radius endmills, and the method includes: a workpiece fixing process of fixing the workpiece that has a thin plate portion; and a machining process of machining the thin plate portion using the radius endmill, and in the machining process, the machining is performed on the workpiece from different directions with the workpiece fixed in the workpiece fixing process.

Since the aforementioned radius endmill is used, chatter vibrations are suppressed even in the case of the workpiece that has the thin plate portion. Also, it is possible to suppress chatter vibrations even when machining is performed from different directions with the workpiece fixed, thereby to perform one-chuck machining, and to perform the machining with high efficiency.

Note that "machining is performed on the workpiece from different directions" means that the machining is performed in the direction vertical to the central axis line of the tool body in a case of machining of a bottom surface while the machining is performed in the direction parallel to the central axis line of the tool body in a case of machining of a side surface, for example. Here, the vertical direction and the parallel direction are allowed to be inclined within the angular range of the circular arc edge.

Advantageous Effects of Invention

Since the regeneration width is reduced by setting the angular range of the circular arc edge to be equal to or less than 30°, it is possible to suppress chatter vibrations and to improve machining stability.

DESCRIPTION OF EMBODIMENTS

Hereinafter, each embodiment according to the present invention will be described with reference to drawings.

First Embodiment

Figure 1:
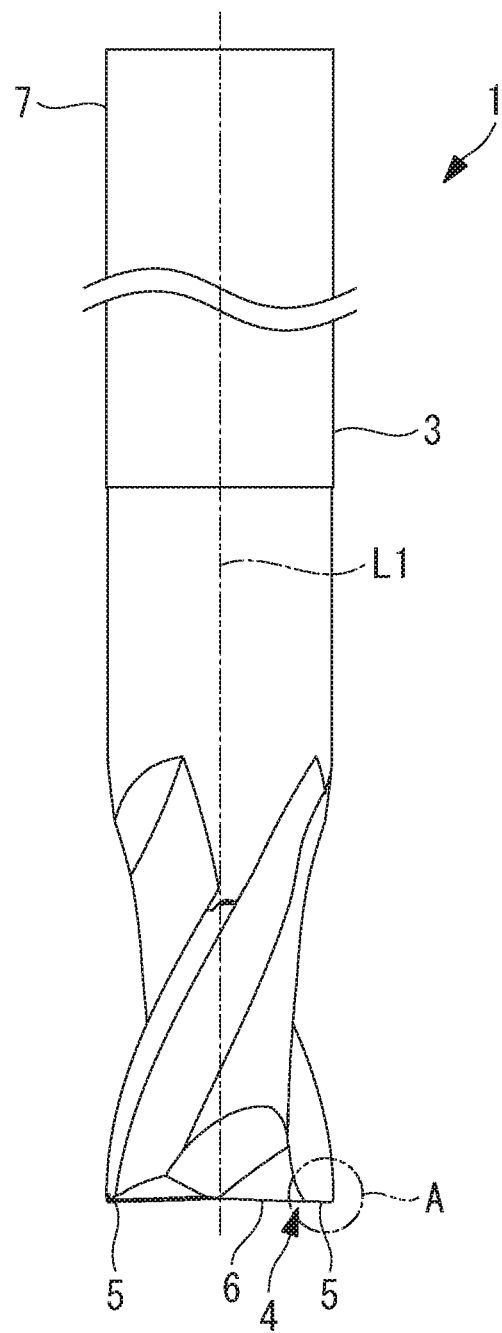
FIG. 1 is a side view of a radius endmill according to a first embodiment of the present invention.

FIG. 1 illustrates a radius endmill 1 according to this embodiment. In the drawing, the radius endmill 1 is caused to rotate about a central axis line L1 by a shank portion of a tool body 3 being fixed to a spindle (drive portion) of a machine tool.

The diameter (tool diameter) of the radius endmill 1 is equal to or greater than 4 mm and equal to or less than 32 mm in a case of an integrated-type endmill. Note that in a case of an edge tip replacement-type cutter, an upper limit of the tool diameter is equal to or greater than 200 mm. A circular arc edge 5 is provided on an outer peripheral side of a bottom surface of a distal end portion 4 of the tool body 3 of the radius endmill 1. Hereinafter, the radius of the arc forming the circular arc edge 5 will be referred to as a nose R [mm]. The radius endmill 1 in the drawing is for machining a bottom surface and is adapted to perform cutting and machining in the tool diameter direction. Regenerative chatter vibrations are likely to be generated when the distal end portion 4 is caused to confront a plate-shaped portion of a workpiece, which is formed as a thin plate, in particular, in a face-to-face manner and the workpiece is fed relatively in the surface extending direction and is machined in the bottom surface.

The number of teeth in the radius endmill 1 illustrated in FIG. 1 is two. However, the number of teeth may be equal to or greater than two. A flank 6 that is recessed relative to the side of the tool body 3 is formed on an inner peripheral side (the side of the central axis line L1) of the circular arc edge 5.

A proximal end portion 7 that is an end portion on the side opposite to the distal end portion 4 of the radius endmill 1 serves as a shank and is fixed to a chuck of the spindle (drive portion) of the machine tool.

Figure 2:
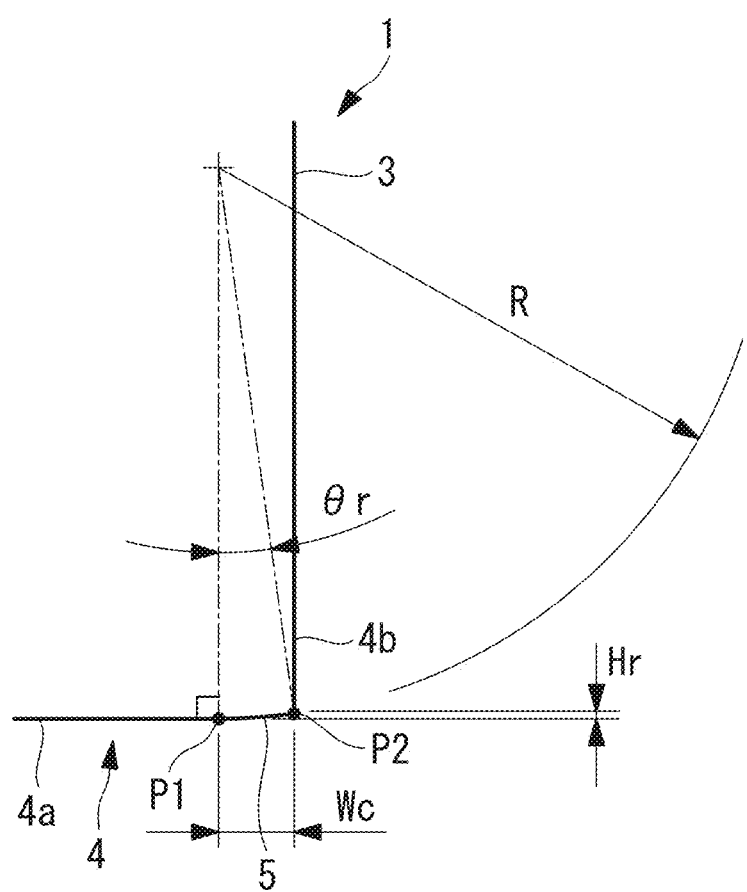
FIG. 2 is an enlarged view illustrating details of the portion A in FIG. 1.

FIG. 2 illustrates details of the portion A in FIG. 1. The circular arc edge 5 is formed as a circular arc edge for a bottom surface from a position P1 having a tangential line in a direction (the horizontal direction in the drawing) that perpendicularly intersects the central axis line L1 in a bottom surface 4a of the distal end portion 4 of the tool body 3 to a position P2 that intersects the side surface 4b in a vertical section including the central axis line L1 (see FIG. 1). Note that the circular arc edge 5 may be provided to extend on the side of the central axis line L1 beyond the position P1. In this manner, smooth connection to a bottom edge provided on the side of the central axis line L1 can be achieved.

A nose R height Hr that is a dimension of the circular arc edge 5 in the direction of the central axis line L1 (the up-down direction in the drawing) is equal to or less than 0.75 mm. The nose R that is a radius of the arc forming the circular arc edge 5 is equal to or greater than 1 mm and equal to or less than 1000 mm. A nose R angle θr that is an angular range in which the circular arc edge 5 is formed is equal to or less than 30°.

The nose R angle θr is represented by the following equation using the nose R height Hr and the nose R.

$$\theta r = \cos^{-1}((R - Hr)/R) \quad (2)$$

The dimension of the circular arc edge 5 in the direction (the horizontal direction in the drawing) that perpendicularly intersects the central axis line L1 corresponds to a regeneration width Wc. The regeneration width Wc is a dimension that may become a cause of regenerative self-excited chatter vibrations and means a dimension in the cutting direction in which cutting with one edge is performed, that is, a dimension in a cutting direction (the horizontal direction in FIG. 2) in which the circular arc edge 5 and the workpiece are brought into contact with each other. As the regeneration width Wc increases, influences of vibrations at the time of regeneration of a previous edge increase.

The regeneration width Wc is represented by the following equation using Equation (2).

$$Wc = R \times \sin \theta r = R \times \sin[\cos^{-1}((R - Hr)/R)] \quad (3)$$

[Ranges of Nose R Height Hr and Nose R Angle θr]

Next, setting ranges of the nose R height Hr and the nose R angle θr illustrated in FIG. 2 will be described.

A comparative regeneration width Wc0 that is a comparison target will be defined as the following equation.

$$Wc0 = R \times \sin[\cos^{-1}((R - Ad)/R)] \quad (4)$$

In the above equation, Ad represents the depth of cut in the direction of the central axis line L1. In other words, the comparative regeneration width Wc0 represented by Equation (4) means that the nose R height is set to the depth of cut Ad. Note that when the depth of cut Ad is greater than the nose R (R<Ad), Ad=R (in other words, the upper limit of the nose R angle is 90°).

Since the regenerative chatter vibrations are affected by the regeneration width Wc, results as in the following table are obtained when the nose R height Hr and the nose R angle θr are determined such that the regeneration width Wc is equal to or less than ½ the comparative regeneration width Wc0 (in other words, Wc0/Wc is equal to or greater than two).

The following table shows a case in which the nose R height Hr according to this embodiment is arranged such that Wc0/Wc is equal to or greater than two by changing the depth of cut Ad.

TABLE 2

Concerning nose R height Hr

| | Nose R [mm] | | | | | | | |
|---|---|---|---|---|---|---|---|---|
| | 1 | 3 | 5 | 10 | 25.4 | 50 | 500 | 1000 |
| Ad 0.5 | 0.09 | 0.11 | 0.11 | 0.12 | 0.12 | 0.12 | 0.12 | 0.12 |
| Ad 1.0 | 0.13 | 0.21 | 0.23 | 0.24 | 0.24 | 0.24 | 0.25 | 0.25 |
| Ad 1.5 | 0.13 | 0.29 | 0.33 | 0.35 | 0.36 | 0.37 | 0.37 | 0.37 |
| Ad 2.0 | 0.13 | 0.35 | 0.41 | 0.46 | 0.48 | 0.49 | 0.5 | 0.5 |
| Ad 2.5 | 0.13 | 0.39 | 0.49 | 0.56 | 0.6 | 0.61 | 0.62 | 0.62 |
| Ad 3.0 | 0.13 | 0.4 | 0.56 | 0.66 | 0.71 | 0.73 | 0.75 | 0.75 |

Figure 3:
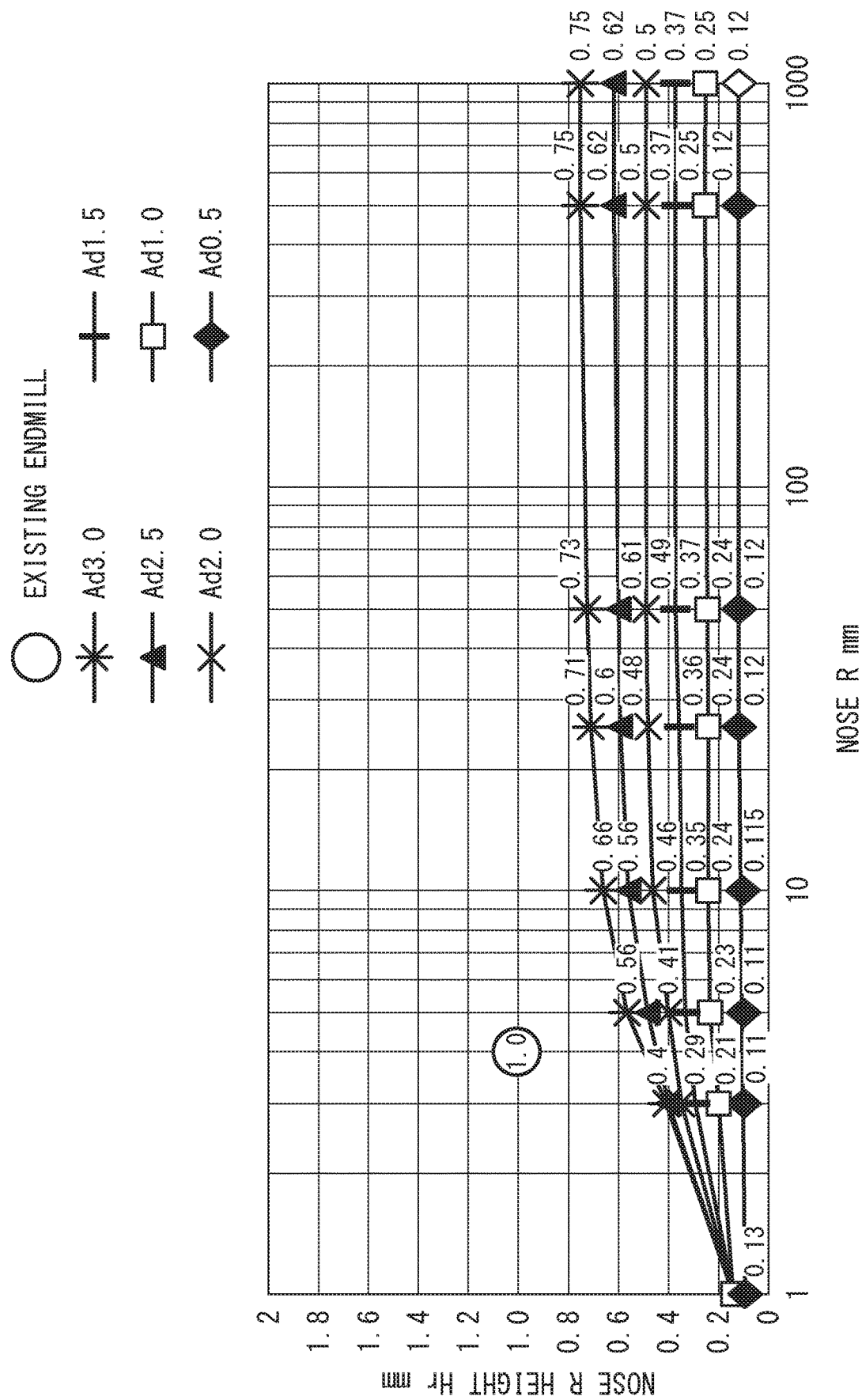
FIG. 3 is a graph illustrating a nose R height Hr with respect to a nose R.

Above Table 2 can be represented by a graph as in FIG. 3. In the drawing, numerical values of an existing radius endmill adapted such that the nose R height Hr is set to be smaller than the nose R for finishing a bottom surface are plotted for reference. As can be understood from the drawing, stability that is equal to or greater than double the stability in the comparative example can be obtained if the nose R height Hr falls within the following range in a case in which the depth of cut Ad is equal to or less than 3.0 mm and the nose R is equal to or greater than 1 mm and equal to or less than 1000 mm in consideration of maximum cutting that is assumed in rough machining.

$$\text{Nose } R \text{ height } Hr \leq 0.75 \text{ mm} \quad (5)$$

The following table shows a case in which the nose R angle θr according to this embodiment is arranged such that Wc0/Wc is equal to or greater than two by changing the depth of cut Ad.

TABLE 1

Axial depth of cut Ad 0.5

| | | Nose R [mm] | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 25.4 | 50 | 500 |
| Present invention | Nose R Height Hr | 0.09 | 0.11 | 0.11 | 0.11 | 0.12 | 0.12 | 0.12 | 0.12 | 0.12 | 0.12 | 0.12 | 0.12 | 0.12 | 0.12 | 0.12 | 0.12 |
| | Nose R Angle θr | 24.5 | 19.1 | 15.6 | 13.5 | 12.6 | 11.5 | 10.6 | 9.9 | 9.4 | 8.9 | 8.5 | 8.1 | 7.8 | 5.6 | 4.0 | 1.3 |
| | Regeneration width Wc | 0.41 | 0.65 | 0.80 | 0.93 | 1.09 | 1.19 | 1.29 | 1.38 | 1.46 | 1.54 | 1.62 | 1.69 | 1.76 | 2.47 | 3.46 | 10.95 |
| Comparative example | Nose R contact angle θ | 60.0 | 41.4 | 33.6 | 29.0 | 25.8 | 23.6 | 21.8 | 20.4 | 19.2 | 18.2 | 17.3 | 16.6 | 15.9 | 11.4 | 8.1 | 2.6 |
| | Regeneration width Wc0 | 0.87 | 1.32 | 1.66 | 1.94 | 2.18 | 2.40 | 2.60 | 2.78 | 2.96 | 3.12 | 3.28 | 3.43 | 3.57 | 5.01 | 7.05 | 22.36 |
| Comparison of regeneration widths (Wc0/Wc) | | 2.09 | 2.02 | 2.06 | 2.08 | 2.00 | 2.01 | 2.01 | 2.02 | 2.02 | 2.02 | 2.02 | 2.02 | 2.03 | 2.03 | 2.04 | 2.04 |

TABLE 3

Concerning nose R angle θr

| | Nose R [mm] | | | | | | | |
|---|---|---|---|---|---|---|---|---|
| | 1 | 3 | 5 | 10 | 25.4 | 50 | 500 | 1000 |
| Ad 0.5 | 24.5 | 15.6 | 12.0 | 8.7 | 5.6 | 4.0 | 1.3 | 0.9 |
| Ad 1.0 | 29.5 | 21.6 | 17.4 | 12.6 | 7.9 | 5.6 | 1.8 | 1.3 |
| Ad 1.5 | 29.5 | 25.4 | 20.9 | 15.2 | 9.7 | 7.0 | 2.2 | 1.6 |
| Ad 2.0 | 29.5 | 28.0 | 23.4 | 17.4 | 11.2 | 8.0 | 2.6 | 1.8 |
| Ad 2.5 | 29.5 | 29.5 | 25.6 | 19.3 | 12.5 | 9.0 | 2.9 | 2.0 |
| Ad 3.0 | 29.5 | 29.9 | 27.4 | 20.9 | 13.6 | 9.8 | 3.1 | 2.2 |

Figure 4:
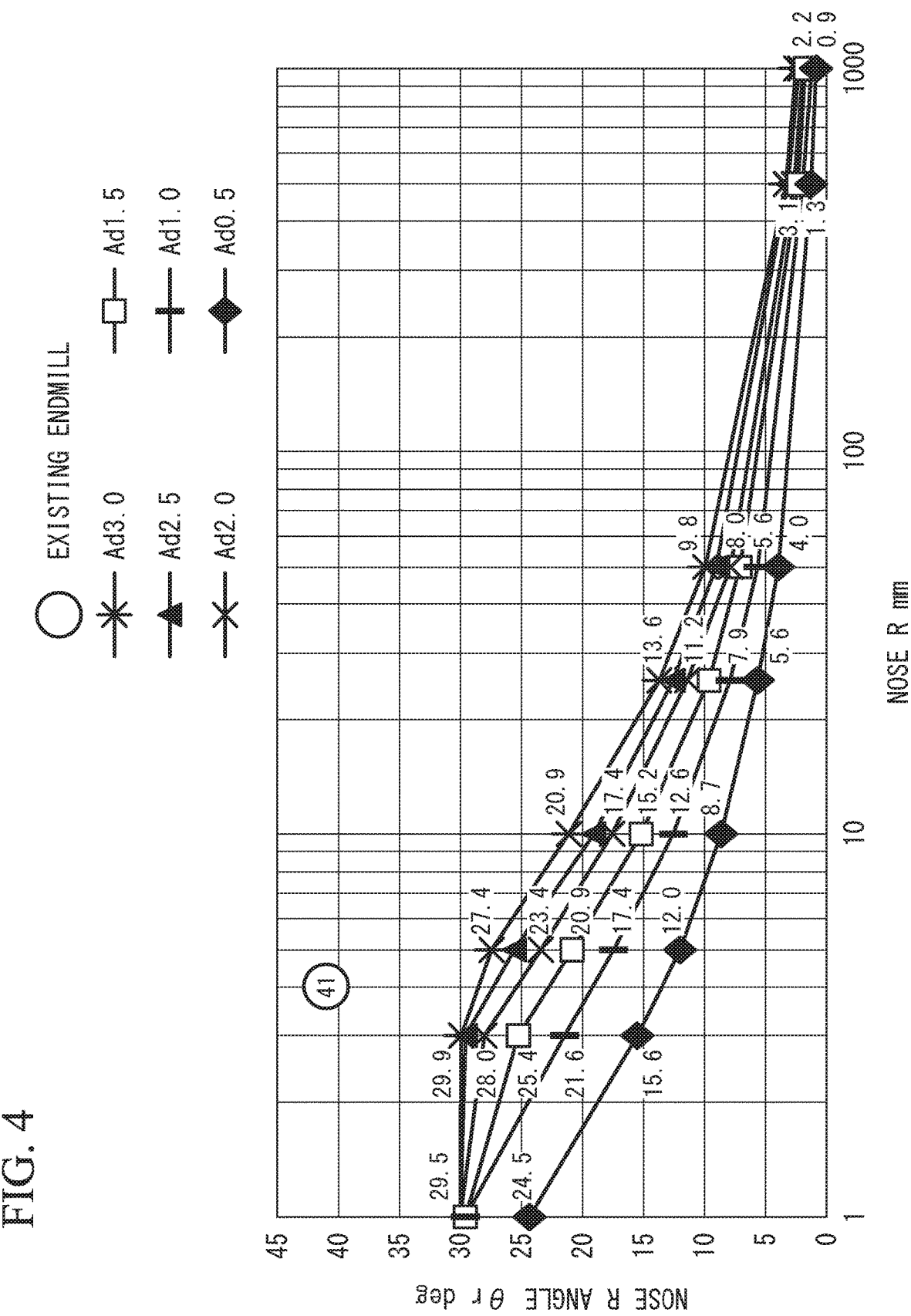
FIG. 4 is a graph illustrating a nose R angle θr.

Above Table 3 can be represented by a graph as in FIG. 4. In the drawing, numerical values of an existing radius endmill adapted such that the nose R height Hr is set to be smaller than the nose R for finishing a bottom surface as illustrated in FIG. 3 are plotted for reference. As can be understood from the drawing, stability that is equal to or greater than double the stability in the comparative example can be obtained if the nose R angle θr falls within the following range in a case in which the depth of cut Ad is equal to or less than 3.0 mm and the nose R is equal to or greater than 1 mm and equal to or less than 1000 mm in consideration of maximum cutting that is assumed in rough machining.

$$0°<\text{nose } R \text{ angle } θr≤30° \tag{6}$$

Note that from the relationship between the nose R and the nose R angle θr, the upper limit of the nose R angle θr is 30° even if the depth of cut Ad increases. This is because Wc0=R in a case of Ad≥R as described above and θr=30° from Equation (3) if the regeneration width Wc according to this embodiment is set to ½ the regeneration width Wc0. The nose R height Hr at this time is R×(1−3^(1/2)/2).

[Determination of Nose R]

Next, a method of determining the nose R will be described.

The nose R is determined on the basis of the feed per one edge and required surface roughness required during machining, specifically, required in terms of a drawing.

The feed rate fz [mm/tooth] is represented by the following equation in a case in which a cutting feed speed of the machine tool is F [mm/min], a spindle rotation frequency of the spindle of the machine tool is S [/min], and the number of teeth is N.

$$fz=F/S/N \tag{7}$$

As mechanical restrictions of the machine tool, the cutting feed speed F has a maximum cutting feed speed Fmax, and a maximum spindle rotation frequency S max is present for the spindle rotation frequency S. It is preferable to perform machining with the cutting feed speed close to Fmax, which is the maximum value, for reducing the machining time.

The surface roughness Rz is represented by the following equation.

$$Rz=fz^2/(8×R) \tag{8}$$

Using Equation (7) and Equation (8), the nose R is represented by the following equation using the surface roughness Rz and the feed rate fz.

$$R=A×fz^2/(8×Rz) \tag{9}$$

Here, A is a coefficient obtained in consideration of practical machining and is equal to or greater than two and equal to or less than four, for example.

Note that the nose R height Hr is preferably set in consideration not only of a hemstitch height (surface roughness Rz) but also of a vibration amplitude Vr [mm] in the direction of the central axis line L1.

$$Hr=Rz+Vr \tag{10}$$

As represented by above Equation (9), the nose R is determined by the feed rate fz determined by the cutting feed speedF of the machine tool and the spindle rotation frequency S and the required surface roughness.

[Machining Method]

Next, a machining method using the radius endmill 1 according to this embodiment will be described.

The workpiece that is a target of machining has a shape molded through sheet metal machining and has a thin plate portion, such as a coupling member adapted to couple a body panel and a frame of an aircraft, for example.

First, the workpiece before cutting is fixed to a workpiece fixing portion of the machine tool (workpiece fixing process).

Next, the proximal end portion 7 (see FIG. 1) of the radius endmill 1 is fixed to the spindle of the machine tool.

The radius endmill 1 is caused to rotate about the central axis line L1 by causing the spindle to rotate, thereby cutting the workpiece (machining process). Since the radius endmill 1 according to this embodiment is for machining a bottom surface, cutting is performed by the depth of cut Ad in the direction of the central axis line L1, and the radius endmill 1 is fed at the cutting feed speedF relative to the workpiece in the direction that perpendicularly intersects the central axis line L1.

The machine tool is controlled in a multiaxial (five axes or six axes, for example) manner, and the workpiece is machined with the radius endmill 1 from different angles at the time of machining. In other words, a plurality of surfaces of the workpiece are machined in one step (one chuck).

As described above, the following effects and advantages are achieved according to this embodiment.

By setting the nose R angle θr of the circular arc edge 5 of the radius endmill 1 for machining a bottom surface to be equal to or less than 30°, it is possible to obtain a regeneration width of equal to or less than ½ a regeneration width obtained in the case in which the angular range of the circular arc edge is set to 90° as in the comparative example (see Table 1), thereby to suppress chatter vibrations, and to improve machining stability.

By setting the nose R height Hr that is the dimension of the circular arc edge 5 of the radius endmill 1 for machining a bottom surface in the direction of the central axis line L1 of the tool body 3 to be equal to or less than 0.75 mm, it is possible to obtain a regeneration width of equal to or less than ½ a regeneration width obtained in the case in which the angular range of the circular arc edge is set to 90° as in the comparative example (see Table 1), thereby to suppress chatter vibrations, and to improve machining stability.

The feed rate fz is calculated from the spindle rotation frequency S of the spindle of the machine tool and the cutting feed speedF. The nose R that is a radius of the circular arc edge 5 of the radius endmill 1 is determined on the basis of the feed rate fz and the required surface roughness Rz required during machining. Thus, it is possible to suppress chatter vibrations and to perform stable machining under arbitrary cutting conditions that satisfy the required surface roughness.

Even in a case of the workpiece that has a thin plate portion as a coupling member, it is possible to suppress chatter vibrations by the machining method according to this embodiment since the workpiece is machined using the radius endmill 1 according to this embodiment. Also, it is possible to suppress chatter vibrations even if machining is performed on the workpiece from different directions with the workpiece fixed, to perform one-chuck machining, and to perform the machining with high efficiency.

Note that performing machining on the workpiece from different directions with the workpiece fixed means that the machining is performed in the direction vertical to the central axis line L1 of the tool body 3 in a case of machining of a bottom surface while machining is performed in the direction parallel to the central axis line L1 of the tool body 3 in a case of machining of a side surface, for example. Here, the vertical direction and the parallel direction are allowed to be inclined within the angular range of the circular arc edge 5.

EXAMPLE

Next, an example of the aforementioned embodiment will be described. In the table below, elements of an endless mill according to this example and elements of a machine tool adapted to perform machining using this endless mill are described. Note that the tool diameter is 20 mm.

TABLE 4

| Edge shape in this example | Rotation frequency S | 18000 | min-1 |
|---|---|---|---|
| | Feeding F | 13000 | mm/min |
| | Number of teeth N | 2 | |
| | Feed per toot fz | 0.361 | mm/tooth |
| | Required surface roughness Rz | 0.0128 | mm |
| | Coefficient A | 4 | |
| | Nose R | 5 | mm |
| | Axial-direction vibration amplitude Vr | 0.035 | mm |
| | Nose R height Hr | 0.05 | mm |
| | Nose R angle θr | 0.14 | rad |
| | Nose R angle θr | 7.93 | deg |
| | Regeneration width Wc | 0.69 | mm |

On the other hand, elements of an existing radius endmill are shown in the following table. Table 5 is for a radius endmill used for rough machining while Table 6 is for a radius endmill used for finishing machining. The tool diameter is 20 mm. Note that the portion R contact angle θ means a contact angle between the nose R and the workpiece in the following tables. In the case of this example, the nose R angle=the portion R contact angle.

TABLE 5

| Existin radius endmill (rough machining) | Axial depth of cut | 3 | mm |
|---|---|---|---|
| | Portion R contact angle θ | 1.159 | rad |
| | Portion R contact angle θ | 66.42 | deg |
| | Regeneration width | 4.58 | mm |
| | Ratio of regeneration width | 7 | |

TABLE 6

| Existing radius endmill (finishing machining) | Axial depth of cut | 0.5 | mm |
|---|---|---|---|
| | Portion R contact angle θ | 0.451 | rad |
| | Portion R contact angle θ | 25.84 | deg |
| | Regeneration width | 2.18 | mm |
| | Ratio of regeneration width | 3 | |

As can be seen from above Tables 4 to 6, it can be understood that in regard to the radius endmill for machining a bottom surface, the regeneration width in this example is one seventh and one third the regeneration width of the existing radius endmill for rough machining and finishing machining, respectively, and chatter vibrations can be significantly reduced. In actual machining of the coupling member, chatter vibrations occurred in the existing radius endmill, while chatter vibrations did not occur in the radius endmill of this example even when the machining was conducted under the same conditions.

Second Embodiment

This embodiment is different in that the first embodiment is adapted for machining a bottom surface while this embodiment is adapted for machining a side surface. Thus, in the following description, points that are different from those in the first embodiment will be described, the same reference sings will be given to similar configurations, and description thereof will be omitted.

Figure 5:
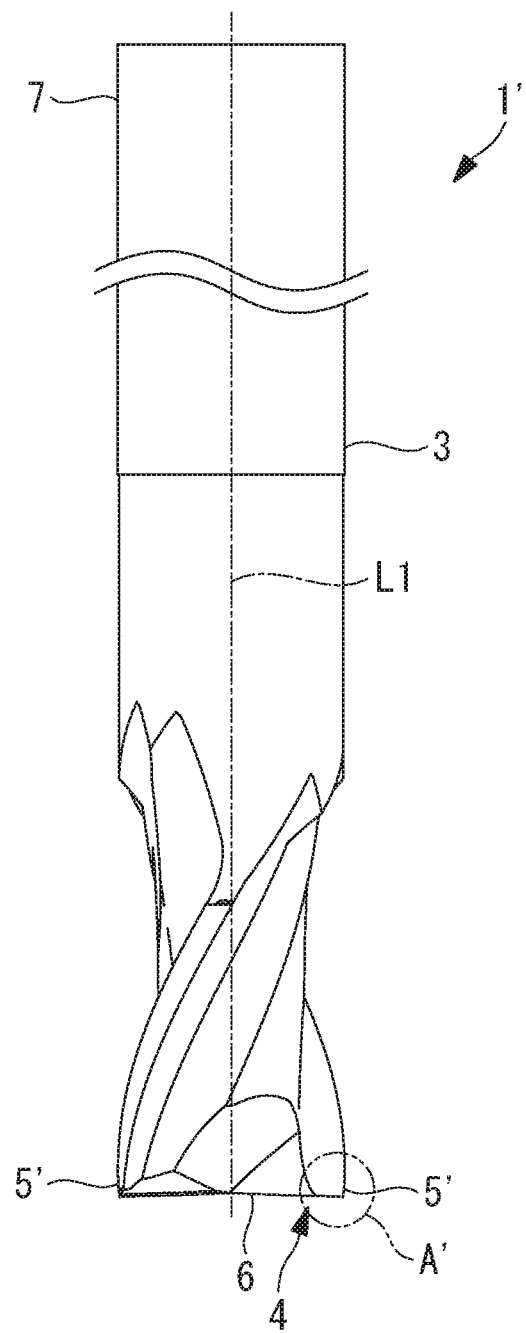
FIG. 5 is a side view of a radius endmill according to a second embodiment of the present invention.

FIG. 5 illustrates a radius endmill 1' according to this embodiment. A circular arc edge 5' is provided on a side surface 4b of a distal end portion of a tool body 3 of the radius endmill 1'. The radius endmill 1' in the drawing is for machining a side surface and is adapted to perform cutting and machining in the direction of a central axis line L1 of the tool body 3.

Figure 6:
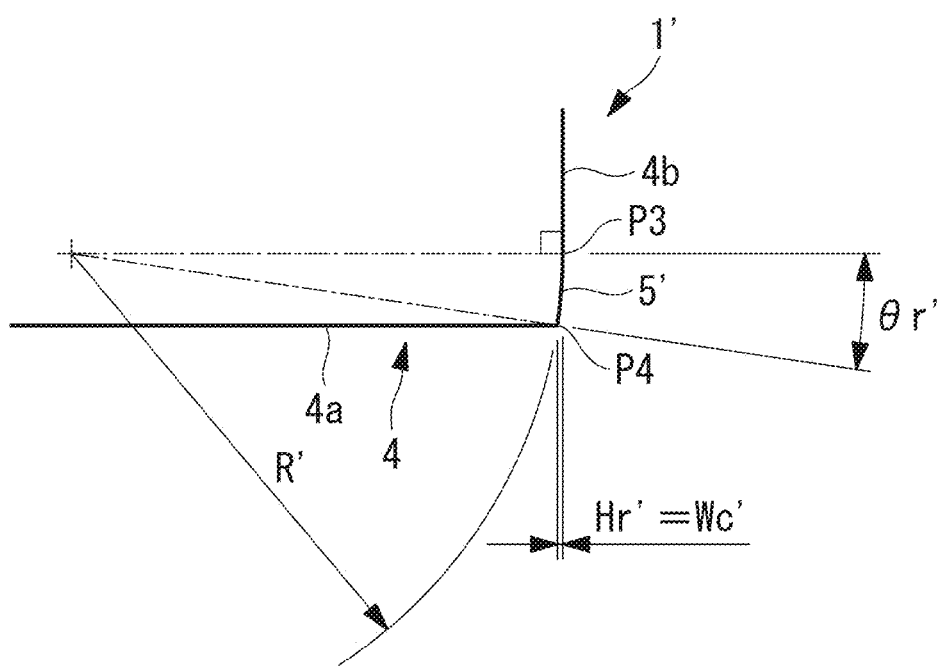
FIG. 6 is an enlarged view illustrating details of the portion A' in FIG. 5.

FIG. 6 illustrates details of the portion A' in FIG. 5. The circular arc edge 5' is formed as a circular arc edge for a side surface from a position P3 having a tangential line in a direction (the up-down direction in the drawing) parallel to the central axis line L1 in the side surface 4b of the distal end portion 4 of the tool body 3 to a position P4 that intersects the bottom surface 4a in a vertical section including the central axis line L1. A nose R height Hr' that is the dimension of the circular arc edge 5' in the direction (the horizontal direction in the drawing) that perpendicularly intersects the central axis line L1 is equal to or less than 0.75 mm. A nose R' that is the radius of the arc forming the circular arc edge 5' is equal to or greater than 1 mm and equal to or less than 1000 mm. A nose R angle θr' that is an angular range in which the circular arc edge 5' is formed is greater than 0° and equal to or less than 30°.

A regeneration width Wc' is the same as the nose R height Hr' (Wc'=Hr').

Since the regeneration width Wc' is equal to or less than ½ the regeneration width Wc0 in the comparative example in which the regeneration width Wc0 is set in accordance with the dimension corresponding to the depth of cut, similarly to the first embodiment, it is possible to suppress chatter vibrations according to this embodiment. Thus, the other effects and advantages are also similar to those of the first embodiment.

Third Embodiment

This embodiment provides a hybrid-type radius endmill 1" as a combination of the circular arc edge 5 according to the first embodiment adapted for machining a bottom surface and the circular arc edge 5' according to the second embodiment adapted for machining a side surface.

Figure 7:
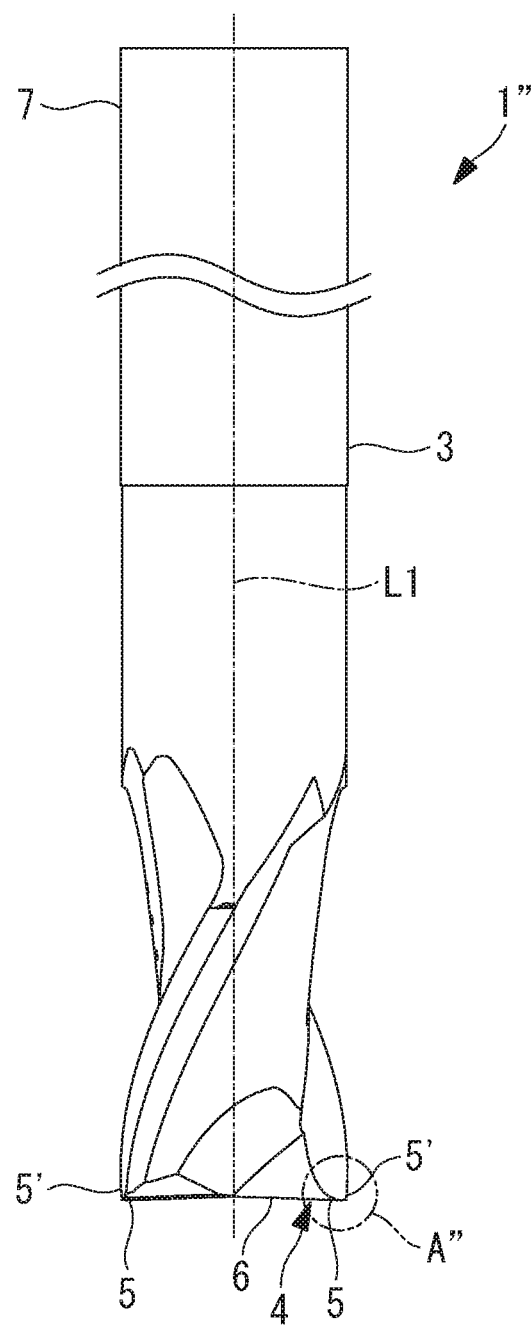
FIG. 7 is a side view of a radius endmill according to a third embodiment of the present invention.

FIG. 7 illustrates the radius endmill 1" according to this embodiment. The circular arc edge 5 is provided on a bottom surface 4a of a distal end portion 4 of a tool body 3 of the radius endmill 1", and the circular arc edge 5' is provided on a side surface 4b. The radius endmill 1" in the drawing can perform machining of a bottom surface using the circular arc edge 5 and machining of a side surface using the circular arc edge 5'.

Figure 8:
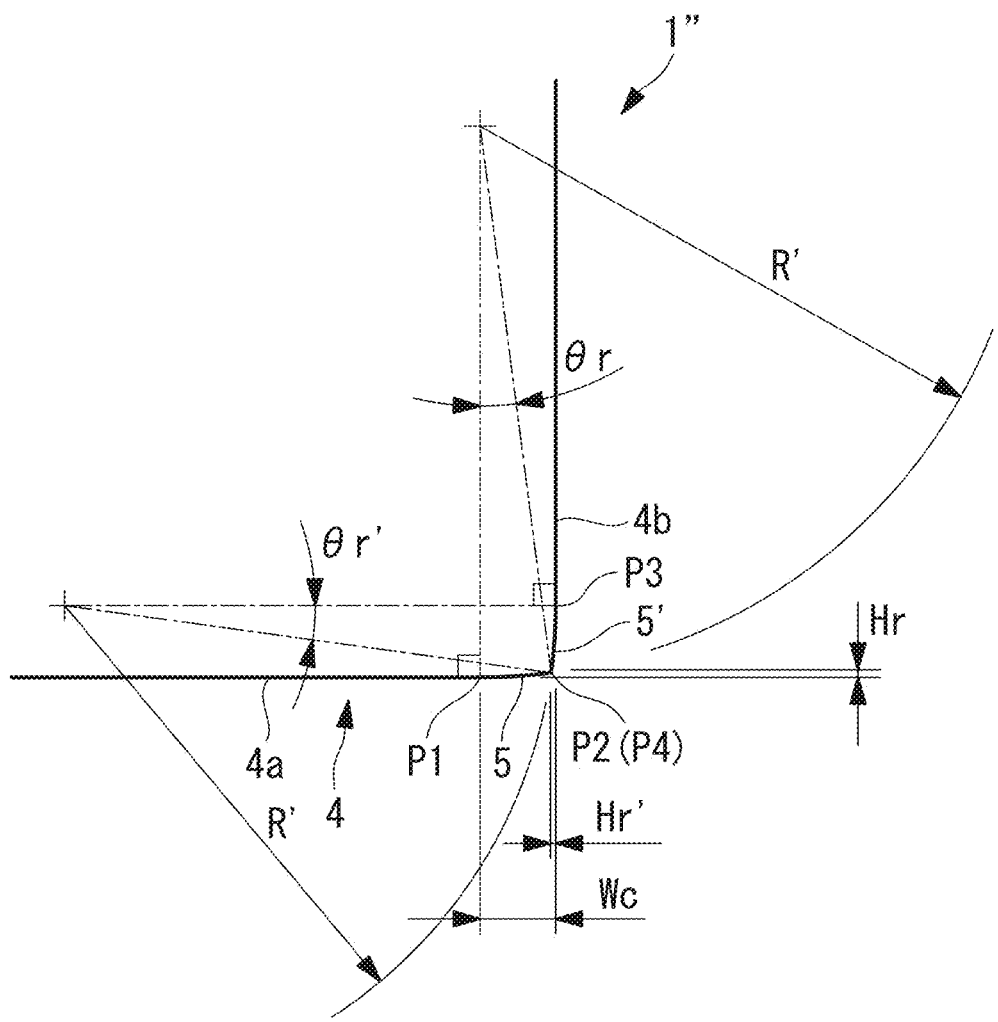
FIG. 8 is an enlarged view illustrating details of the portion A" in FIG. 7.
Figure 9:
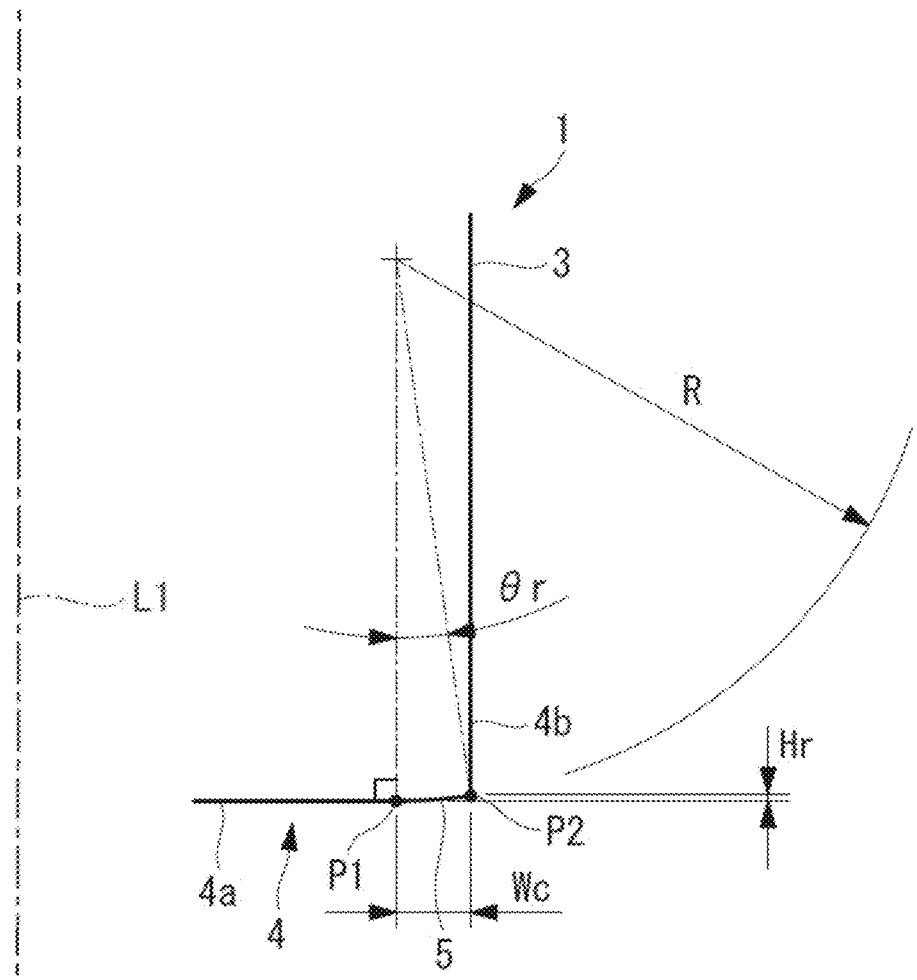
FIG. 9 is a vertical section view corresponding to the portion A in FIG. 1.
Figure 10:
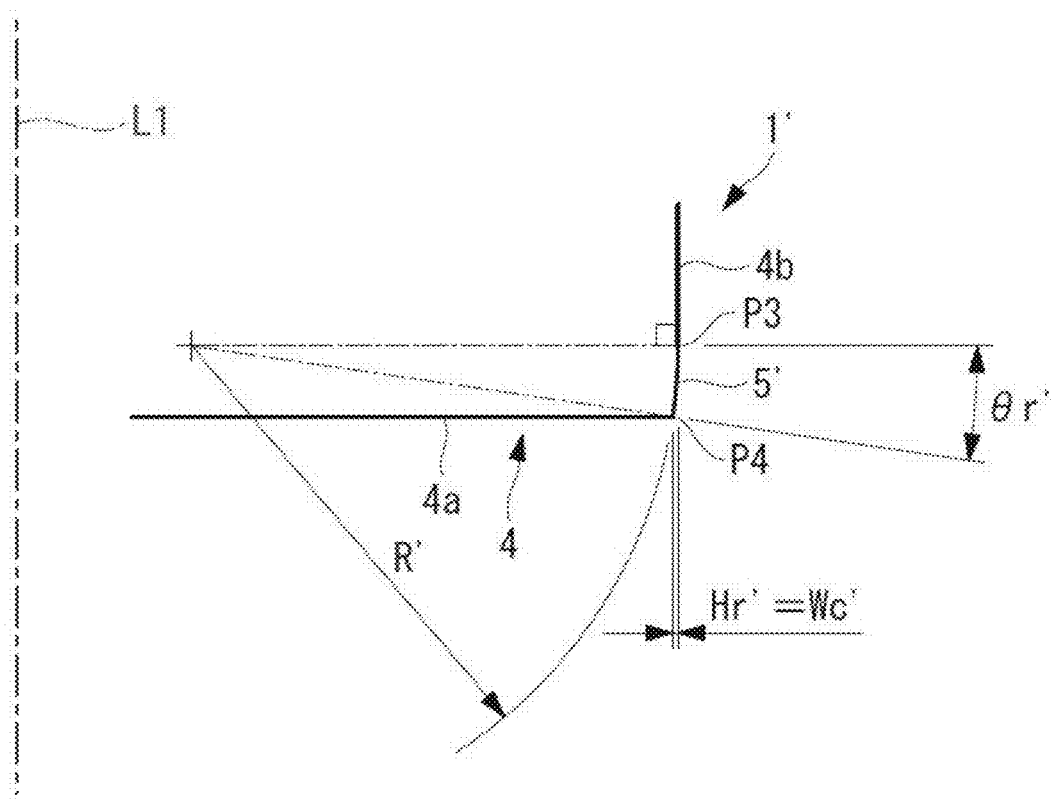
FIG. 10 is a vertical section view corresponding to the portion A' in FIG. 5.
Figure 11:
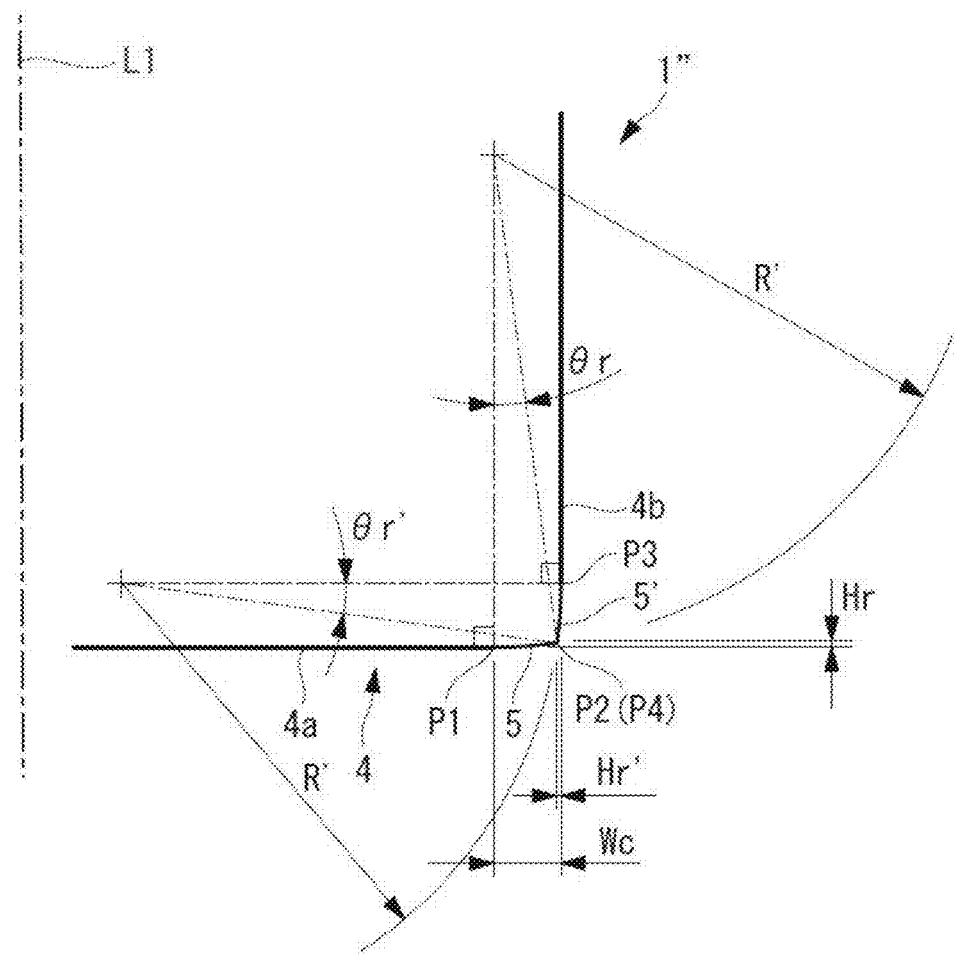
FIG. 11 is a vertical section view corresponding to the portion A" in FIG. 7

FIG. 8 illustrates details of the portion A" in FIG. 7.

The circular arc edge 5 is formed as a circular arc edge for a bottom surface from the position P1 having a tangential line in the direction (the horizontal direction in the drawing) that perpendicularly intersects the central axis line L1 in the bottom surface 4a of the distal end portion 4 of the tool body 3 to the position P2 that intersects the side surface 4b in a vertical section including the central axis line L1. A nose R height Hr that is a dimension of the circular arc edge 5 in the direction (the up-down direction in the drawing) of the central axis line L1 is equal to or less than 0.75 mm. A nose R that is a radius of the arc forming the circular arc edge 5 is equal to or greater than 1 mm and equal to or less than 1000 mm. A nose R angle θr that is an angular range in which the circular arc edge 5 is formed is greater than 0° and equal to or less than 30°.

The circular arc edge 5' is formed as a circular arc edge for a side surface from the position P3 having a tangential line in the direction (the up-down direction in the drawing) parallel to the central axis line L1 in the side surface 4b of the distal end portion 4 of the tool body 3 to the position P4 (the same position as the position P2) that intersects the bottom surface 4a in a vertical section including the central axis line L1. A nose R height Hr' that is a dimension of the circular arc edge 5' in the direction (the horizontal direction in the drawing) that perpendicularly intersects the central axis line L1 is equal to or less than 0.75 mm. A nose R' that is a radius of the arc forming the circular arc edge 5' is equal to or greater than 1 mm and equal to or less than 1000 mm. A nose R angle θr' that is an angular range in which the circular arc edge 5' is formed is greater than 0° and equal to or less than 30°.

A regeneration width Wc' is R'×sin θr+Hr'.

Since the regeneration width Wc' is equal to or less than ½ the regeneration width Wc0 in the comparative example in which the regeneration width Wc0 is set in accordance with the dimension corresponding to the depth of cut, similarly to the first embodiment and the second embodiment, it is possible to suppress chatter vibrations according to this embodiment. Thus, the other effects and advantages are also similar to those of the first embodiment and the second embodiment.

REFERENCE SIGNS LIST 1, 1', 1" Radius endmill
3 Tool body
4 Distal end portion
4a Bottom surface
4b Side surface
5, 5' Circular arc edge
6 Flank
7 Proximal end portion
Ad Depth of cut
F Cutting feed speed
fz Feed per tooth
Hr, Hr' Nose R height
L1 Central axis line
N Number of teeth
R, R' Nose R (radius of circular arc edge)
Rz Surface roughness
S Spindle rotation frequency
θr, θr' Nose R angle

The invention claimed is:

1. A radius endmill comprising:
a tool body having
a bottom surface at a distal end portion thereof,
a side surface, and
a bottom circular arc edge provided on the bottom surface at an outer periphery thereof,
wherein the bottom circular arc edge is formed starting from a first position defined at a first corner point in the bottom surface forming a tangential line and perpendicularly intersecting a central axis line of the tool body, and terminating on a second position at a second corner point intersecting with the side surface of the tool body, in a vertical section including the central axis line, in which the bottom circular arc edge forms a discontinued radius of curvature interrupted at the intersection with the side surface, and
an angular range of the bottom circular arc edge from the first position in the bottom surface to the second position intersecting with the side surface is equal to or less than 30° in the vertical section.

2. The radius endmill according to claim 1,
wherein a dimension of the bottom circular arc edge along the central axis line is equal to or less than 0.75 mm.

3. A radius endmill, comprising:
a tool body having
a bottom surface at a distal end portion thereof,
a side surface, and
a side circular arc edge provided on the side surface thereof,
wherein the side circular arc edge is formed starting from a third position defined at a third corner point in the side surface forming a tangential line in a direction parallel to a central axis line of the tool body, and terminating on a fourth position at a fourth corner point intersecting with the bottom surface of the tool body at the distal end portion, in a vertical section including the central axis line, in which the side circular arc edge forms a discontinued radius of curvature interrupted at the intersection with the bottom surface, and
an angular range of the side circular arc edge from the third position in the side surface to the fourth position intersecting with the bottom surface is equal to or less than 30° in the vertical section.

4. A radius endmill, comprising:
a tool body having
a bottom surface at a distal end portion thereof,
a side surface,
a bottom circular arc edge provided on the bottom surface at an outer periphery thereof, and
a side circular arc edge provided on the side surface thereof,
wherein the bottom circular arc edge is formed starting from a first position defined at a first corner point in the bottom surface forming a tangential line and perpendicularly intersecting a central axis line of the tool body, and terminating on a second position at a second corner point intersecting with the side surface of the tool body, in a vertical section including the central axis line, in which the bottom circular arc edge forms a discontinued radius of curvature interrupted at the intersection with the side surface,
the side circular arc edge is formed starting from a third position defined at a third corner point in the side surface forming a tangential line in a direction parallel to the central axis line, and terminating on a fourth position at a fourth corner point intersecting with the bottom surface of the tool body at the distal end portion, in the vertical section including the central axis line, in which the side circular arc edge forms a discontinued radius of curvature interrupted at the intersection with the bottom surface, an angular range of the bottom circular arc edge from the first position in the bottom surface to the second position intersecting with the side surface is equal to or less than 30° in the vertical section, and
an angular range of the side circular arc edge from the third position in the side surface to the fourth position intersecting with the bottom surface is equal to or less than 30° in the vertical section.

5. The radius endmill according to claim 3,
wherein a dimension of the side circular arc edge along a direction that perpendicularly intersects a direction of the central axis line is equal to or less than 0.75 mm.

6. The radius endmill according to claim 4,
wherein a dimension of the bottom circular arc edge along a direction of the central axis line is equal to or less than 0.75 mm, and
a dimension of the side circular arc edge along a direction that perpendicularly intersects a direction of the central axis line is equal to or less than 0.75 mm.

* * * * *